United States Patent
Yun

(10) Patent No.: US 9,175,864 B2
(45) Date of Patent: Nov. 3, 2015

(54) ENERGY-SAVING CENTRAL HEATING AND HOT WATER SUPPLY SYSTEM

(75) Inventor: Sok Ku Yun, Seoul (KR)

(73) Assignee: GU-SUNG ENGINEERING & CONSTRUCTION CO., LTD., Seoul (KR)

( * ) Notice: Subject to any disclaimer, the term of this patent is extended or adjusted under 35 U.S.C. 154(b) by 925 days.

(21) Appl. No.: 13/310,905

(22) Filed: Dec. 5, 2011

(65) Prior Publication Data

US 2012/0227953 A1    Sep. 13, 2012

(30) Foreign Application Priority Data

Mar. 10, 2011  (KR) .................. 10-2011-0021330

(51) Int. Cl.
   *F24D 3/08*   (2006.01)
   *F24D 3/02*   (2006.01)
   *F24D 19/10*  (2006.01)

(52) U.S. Cl.
   CPC *F24D 3/02* (2013.01); *F24D 3/087* (2013.01); *F24D 19/1066* (2013.01); *F24D 19/1069* (2013.01)

(58) Field of Classification Search
   CPC ....... F24D 3/087; F24D 3/02; F24D 19/1006; F24D 19/0012; F24D 19/1048; F24D 19/1069; F24D 19/1081; F24D 10/00
   USPC ................... 237/8 A, 8 C, 2 A, 63, 62, 59, 13
   See application file for complete search history.

(56) References Cited

U.S. PATENT DOCUMENTS

| | | | | |
|---|---|---|---|---|
| 208,633 A | * | 10/1878 | Prall | 237/13 |
| 236,247 A | * | 1/1881 | Osborne | 237/13 |
| RE9,821 E | * | 7/1881 | Abbot et al. | 237/13 |
| 379,283 A | * | 3/1888 | Prall | 237/12.1 |
| 387,201 A | * | 8/1888 | Abbot et al. | 237/13 |
| 427,634 A | * | 5/1890 | Stuart | 237/63 |
| 461,281 A | * | 10/1891 | Searle | 237/35 |
| 461,282 A | * | 10/1891 | Searle | 237/35 |
| 465,298 A | * | 12/1891 | Timby | 165/48.1 |
| 527,626 A | * | 10/1894 | Spear | 237/63 |
| 663,746 A | * | 12/1900 | Fowler et al. | 237/48 |
| 741,070 A | * | 10/1903 | Reck | 237/62 |

(Continued)

FOREIGN PATENT DOCUMENTS

| | | | | |
|---|---|---|---|---|
| DE | 3244005 A1 | * | 5/1984 | ........... F24D 11/02 |
| DE | 102010025115 A1 | * | 12/2011 | ........... F24J 2/40 |

(Continued)

*Primary Examiner* — Gregory Huson
*Assistant Examiner* — Daniel E Namay
(74) *Attorney, Agent, or Firm* — Paratus Law Group, PLLC

(57) ABSTRACT

An energy-saving heating and hot water supply system includes a main heat exchanger, a circulation pump, a hot water supply heat exchanger and a hot water distributor. The main heat exchanger produces heating water through a heat exchange. The circulation pump circulates the heating water produced in the main heat exchanger so that the heating water is supplied to and collected from each household or floor. The hot water supply heat exchanger produces hot water through a heat exchange between water for hot water supply and the heating water supplied from the main heat exchanger and circulates the produced hot water in a floor coil through the hot water distributor or directly circulates the produced hot water in the floor coil. The hot water distributor receives the heating water and circulates the received heating water in the floor coil provided for each household or floor.

9 Claims, 11 Drawing Sheets

(56) References Cited

U.S. PATENT DOCUMENTS

| | | | | |
|---|---|---|---|---|
| 787,748 A * | 4/1905 | Glantzberg | | 237/13 |
| 894,897 A * | 8/1908 | Osborne | | 237/12.1 |
| 1,114,247 A * | 10/1914 | Gamble | | 237/58 |
| 1,366,208 A * | 1/1921 | Noonan | | 122/18.4 |
| 2,005,852 A * | 6/1935 | Broderick | | 237/8 R |
| 2,159,284 A * | 5/1939 | Miller | | 237/8 R |
| 2,204,708 A * | 6/1940 | Smith | | 237/8 R |
| 2,519,266 A * | 8/1950 | Main | | 237/8 R |
| 2,539,469 A * | 1/1951 | Powers | | 237/8 R |
| 2,781,174 A * | 2/1957 | Smith | | 237/8 C |
| 3,178,113 A * | 4/1965 | Curry et al. | | 237/8 R |
| 3,482,778 A * | 12/1969 | Lanzoni | | 237/8 R |
| 3,873,022 A * | 3/1975 | Hilgemann | | 237/8 R |
| 4,034,912 A * | 7/1977 | Hayes | | 126/587 |
| 4,111,259 A * | 9/1978 | Lebduska | | 237/1 R |
| 4,257,556 A * | 3/1981 | Skala | | 237/7 |
| 4,401,100 A * | 8/1983 | Slater et al. | | 126/362.1 |
| 4,537,348 A * | 8/1985 | Gossi | | 237/8 A |
| 4,601,426 A * | 7/1986 | Brosenius | | 237/59 |
| 5,119,988 A * | 6/1992 | Fiedrich | | 237/8 C |
| 5,209,401 A * | 5/1993 | Fiedrich | | 237/8 C |
| 5,556,027 A * | 9/1996 | Fiedrich | | 237/8 R |
| 5,573,183 A * | 11/1996 | Leskinen | | 237/8 R |
| 6,035,932 A * | 3/2000 | Goeler et al. | | 165/297 |
| 6,220,520 B1 * | 4/2001 | Gibbs | | 237/8 R |
| 6,237,855 B1 * | 5/2001 | Stickney et al. | | 237/8 R |
| 8,505,498 B2 * | 8/2013 | Acker | | 122/20 R |
| 8,600,563 B2 * | 12/2013 | Ben-Yaacov et al. | | 700/278 |
| 8,794,538 B2 * | 8/2014 | Park et al. | | 237/2 B |
| 8,826,903 B2 * | 9/2014 | Thoma | | 126/609 |
| 2002/0026904 A1 * | 3/2002 | Maruyama | | 122/414 |
| 2005/0183773 A1 * | 8/2005 | Sinclaire | | 137/357 |
| 2005/0284948 A1 * | 12/2005 | Robinson et al. | | 237/12.3 R |
| 2006/0196958 A1 * | 9/2006 | Dancey et al. | | 237/67 |
| 2008/0092875 A1 * | 4/2008 | Leifer et al. | | 126/617 |
| 2009/0223509 A1 * | 9/2009 | Hoellenriegel et al. | | 126/643 |
| 2009/0277203 A1 * | 11/2009 | Dupraz | | 62/238.7 |
| 2010/0025488 A1 * | 2/2010 | Park et al. | | 237/2 B |
| 2011/0073666 A1 * | 3/2011 | Jang | | 236/12.11 |
| 2011/0083462 A1 * | 4/2011 | Engelhart et al. | | 62/324.1 |
| 2012/0043390 A1 * | 2/2012 | Noh et al. | | 237/2 A |
| 2012/0061483 A1 * | 3/2012 | Lee | | 237/8 A |

FOREIGN PATENT DOCUMENTS

| | | | | |
|---|---|---|---|---|
| EP | 309440 A2 * | 3/1989 | | F24D 3/02 |
| EP | 543769 A1 * | 5/1993 | | F24D 10/00 |
| EP | 2383523 A1 * | 2/2011 | | F24D 3/08 |
| JP | 2002031408 A * | 1/2002 | | F24H 1/00 |
| JP | 2009281639 A * | 12/2009 | | |
| JP | 2010286137 A * | 12/2010 | | |
| JP | 2011237081 A * | 11/2011 | | |
| WO | SE 200400279 A * | 8/2005 | | F24D 3/10 |

\* cited by examiner

-Prior Art-

ENERGY-SAVING CENTRAL HEATING AND HOT WATER SUPPLY SYSTEM

CROSS-REFERENCE TO RELATED APPLICATION

This application claims the benefit of Korean Patent Application No. 10-2010-0021330, filed Mar. 10, 2011, the disclosure of which is hereby incorporated herein by reference in its entirety.

BACKGROUND OF THE INVENTION

1. Field of the Invention

An aspect of the present invention relates to a central heating and hot water supply system for receiving a heat source such as steam or high-temperature water obtained from a medium- or large-sized boiler, a heat source obtained from nature such as sunlight, or a heat source obtained from waste heat of an electric generator or boiler, producing hot water through a heat exchange, and supplying the hot water from small- and medium-scale buildings to large-scale buildings using a central supply method. More particularly, an aspect of the present invention relates to an energy-saving central heating and hot water supply system which can simplify pipeline equipment for supplying hot water to each household by removing a hot water supply pipe connected to each household from a machine room, and which can save energy used for heating and hot water supply by circulating heating water used for production of hot water through a bottom coil installed in each household or floor.

2. Description of the Related Art

In recent large-scale apartment complexes or medium- and large-scale buildings, heating and hot water supply systems have not been established as individual heating and hot water supply systems but been established as central heating and hot water supply systems. In the central heating and hot water supply system, heating and hot water is supplied to each household or floor through a common piping network by establishing a common heating system for the entire complex, and the hot water supply is generated by heating water supplied to the system to an appropriate temperature through a heat exchange between hot water and the supplied water and then supplying the heated water to each household or floor through the piping network.

In the central heating and hot water supply system, heat source equipment having relatively high efficiency is commonly used for many users, and a professional manager maintains and repairs the heat source equipment. Thus, the central heating and hot water supply system can actively prevent the decrease of efficiency, caused by the long continuous use of the heat source equipment, and reduce the entire capacity of the heat source equipment, as compared with the individual heating and hot water supply system. Further, since heating source equipment is concentrated on one place, it is easy to deal with an emergency situation such as a fire.

However, in the central heating and hot water supply system, the installation area of equipment for heating and hot water supply increases, and the cost of equipment increases more than that in the individual heating and hot water supply system. Further, civil complaints may occur due to an increase in cost of piping equipment and occurrence of maintenance and operating expenses.

FIG. 1 is a structural view of a conventional central heating and hot water supply system.

In the central heating and hot water supply system, a heat source such as hot water, medium temperature water or steam produced in a heat producing facility 10 is supplied to a machine room 20 located at a structure such as an apartment or building, and the heat source supplied to the machine room 20 is supplied to a heat exchanger 30 for heating and a heat exchanger 40 for hot water supply so as to produce heating water and hot water. Then, the produced heating water and hot water are supplied to each household.

In addition to the heat exchanger 30 for heating and the heat exchanger 40 for hot water supply, a water supply pump 50, equipment such as a heating circulation pump 31 and a hot water supply circulation pump 41 are provided in the machine room 20. The heating water and hot water produced in the machine room 20 are supplied to each household via machine-room pipes, common pipes and horizontal and vertical pipes installed in each structure.

However, in the conventional system configured as described above, the hot water produced in the machine room flows for a long distance through the machine-room pipes, the common pipes and the horizontal and vertical pipes, and is then supplied to each household. Therefore, heat loss through the pipes is large (it is typically identified that up to 10 to 30% of the heat of the entire hot water supply energy is lost), and power consumption for fluid transfer is large. Since more pipe installation cost is required to connect between the machine room and each household, the cost of construction work increases. Further, the effective space of the structure is reduced due to installation of a medium- or large-sized heat exchanger and pipe equipment and machine room space, a basement, and a pipe duct.

An integrated piping system of an apartment house and building has been disclosed in Korean Patent Laid-Open Publication No. 2010-0118473.

FIG. 2 is a structural view of the public housing and building integrated piping system.

The public housing and building integrated piping system includes an integrated heat exchanger 110, an integrated supply pipe 120, an integrated return pipe 130, a supply pipe 140, a return pipe 150, a hot water supply pipe 160, a hot water return pipe 170, a hot water heat exchanger 180, and a cooling/heating controller 200. The integrated heat exchanger 110 supplies high-temperature water produced by a heat producing facility and heated water heat-exchanged in the integrated heat exchanger 110 to each household or floor in an apartment house. The integrated supply pipe 120 supplies the heated water heat-exchanged in the integrated heat exchanger 110. The integrated return pipe 130 is connected to the integrated supply pipe 120 so as to collect the heated water. The supply pipe 140 is installed for each household or floor in the apartment house and is branched from the integrated supply pipe 120 so as to supply the heated water. The return pipe 150 is installed for each household or floor in the apartment house and is branched from the integrated return pipe 130 so as to collect the heated water. The hot water supply pipe 160 is branched from the supply pipe 140 so as to supply the heat water. The hot water return pipe 170 is branched from the return pipe 150 so as to collect the heated water after heat is exchanged. The hot water supply heat exchanger 180 is connected to the hot water supply pipe 160, the hot water return pipe 170 and a water supply pipe 101 so as to supply hot water by performing a heat exchange between heated water transferred through the hot water supply pipe 160 and cool water supplied through the water supply pipe 101, and discharges the heated water heat-exchanged with the cool water to the hot water return pipe 170. The cooling/heating controller 200 controls the flow rate of the heated water supplied to the supply pipe 140 and the hot water supply pipe 160.

The integrated piping system of an apartment house and building configured as described above uses an integrated pipe for heating and hot water supply, so that it is possible to decrease building construction cost, equipment construction cost, and equipment management and maintenance cost.

However, since the integrated pipe system described above supplies both heating water and hot water through the integrated supply pipe, a large-capacity pump is required in order that the flow rate required in the heating and hot water supply can be sufficiently supplied, and the diameter of the pipe is necessarily increased. Further, low-temperature water is locally heated by many heat sources for hot water heating. For this reason, if the thermal capacity of the heated water is not efficiently radiated, the effect of improvement may be insignificant. Furthermore, unreasonable energy loss may be caused due to excessive equipment capacity, or the like.

That is, since heated water is collected at a relatively high temperature in the process of collecting the heated water to the integrated heat exchanger after heating or producing hot water through the heat exchanger, the integrated pipe system in the apartment house and building has a problem of limited energy savings, such as a large amount of heat loss due to a great difference in temperature between the inside and outside of the pipe. Since heating water and hot water are separately heated through the integrated pipe, more heat capacity is required in each household or floor. Therefore, various problems may occur due to surplus heat capacity or flow rate supplied when the hot water supply and heater are not simultaneously used to the maximum load, particularly when demand on hot water supply is decreased or does not occur. Accordingly, a system is required to solve such problems, but a control method is not specified. As a result, floor noise may occur due to an increase of flow velocity in a heating pipe installed in the floor, caused by an excess amount of circulation water, and the total heat effectiveness of radiant heating in the floor may be decreased.

SUMMARY OF THE INVENTION

Embodiments of the present invention provide an energy-saving central heating and hot water supply system in which heated water used for producing hot water is circulated through a hot water distributor provided for each household or floor or directly circulated in a floor coil, so that it is possible to improve the use efficiency of the supplied hot water, to minimize heat loss caused in the process of circulating the heating water in a main heat exchanger and to save energy.

Embodiments of the present invention also provide an energy-saving central heating and hot water supply system in which excessive energy consumption in the conventional method of equally supplying hot water even when the required temperatures of hot water are different from each other is prevented by enabling hot water to be supplied suitable for the required temperature of hot water for each household or floor, so that it is possible to save energy and to improve the environment in which the hot water is used.

Embodiments of the present invention also provide an energy-saving central heating and hot water supply system in which when a user uses hot water, the hot water with a temperature set by the user is immediately supplied, so that it is possible to reduce or remove the amount of tepid or cool water discharged without being used initially, thereby preventing waste of water resources.

Embodiments of the present invention also provide an energy-saving central heating and hot water supply system in which since the supply of hot water is intermittent, heating is controlled to stop heating the hot water temporarily or hot water discharged after the heating of the hot water is reused, so that only the heat capacity corresponding to the maximum load in the heating and hot water supply is supplied, thereby remarkably reducing the supply amount of hot water supplied to an integrated hot water supply main pipe, that the size of installation pipes is reduced, thereby saving construction costs, that the total heat area is decreased, thereby reducing heat loss, and that the flow rate of transferred hot water is decreased, thereby reducing operating costs.

Embodiments of the present invention also provide an energy-saving central heating and hot water supply system in which the flow rate of heating water is variably controlled depending on heating and hot water loads required through an operation control of a heating water circulation pump for circulating the heating water, so that it is possible to reduce energy cost.

According to an aspect of the present invention, there is provided an energy-saving central heating and hot water supply system, the system including: a main heat exchanger configured to receive one heat source of hot water, medium temperature water, and steam from a heat production facility and to produce heating water through a heat exchange; a circulation pump configured to circulate the heating water produced in the main heat exchanger so that the heating water is supplied to and collected from each household or floor; a hot water supply heat exchanger provided for each household or floor to produce hot water through a heat exchange between water for hot water supply and the heating water supplied from the main heat exchanger and circulate the produced hot water in a floor coil through a hot water distributor provided for each household or floor or directly circulate the produced hot water in the floor coil; an integrated hot water supply main pipe extended from the main heat exchanger to supply the produced hot water; an integrated hot water return main pipe extended from the main heat exchanger to return the used heating water; a heating water supply pipe configured to connect the integrated hot water supply main pipe to a supply side of the hot water distributor; a heating water return pipe configured to connect the integrated hot water return main pipe to a collection side of the hot water distributor; a heating water supply pipe for hot water supply branched from the heating water supply pipe and connected to the hot water supply heat exchanger; a first valve installed in the heating water supply pipe to control a flow path of the heating water supply pipe; a second valve installed in the heating water supply pipe for hot water supply so as to control a flow path of the heating water supply pipe for hot water supply; a controller configured to control the first and second valves to supply the heating water supplied through the heating water supply pipe to the hot water distributor or the hot water supply heat exchanger depending on the presence of use of the hot water; a bypass pipe configured to return a portion of the heating water supplied from the hot water supply heat exchanger to the hot water distributor to the heating water return pipe by connecting the heating water supply pipe to the heating water return pipe; and a pipeline control unit configured to distribute the heating water discharged from the hot water supply heat exchanger to the hot water distributor and the bypass pipe at a predetermined ratio.

The pipeline control unit may be configured as a proportional control 3-way valve provided at a connection portion between the heating water supply pipe and the bypass pipe so as to distribute the heating water to the heating water supply pipe and the bypass pipe based on a value set by the controller.

The first valve may be configured as a constant flow on/off valve for controlling the flow path of the heating water supply pipe so that heating water with a flow rate corresponding to the set value flows through the heating water supply pipe and for opening/closing the flow path of the heating water supply pipe, and the second valve may be configured as a constant flow on/off valve for controlling the flow path of the heating water supply pipe for hot water supply so that the heating water with the flow rate corresponding to the set value flows through the heating water supply pipe for hot water supply and for opening/closings the flow path of the heating water supply pipe for hot water supply.

The pipeline control unit may include a constant flow valve installed at an end of the heating water supply pipe to control the flow path of the heating water supply pipe so that the heating water with the flow rate corresponding to the set value is supplied to the hot water distributor; and a third constant flow on/off valve installed in the bypass pipe so as to control a flow path of the bypass pipe so that the heating water with the flow rate corresponding to the set value is discharged through the bypass pipe and to open/close the flow path of the bypass pipe.

The first valve may be configured as an on/off valve for opening/closing the heating water supply pipe, and the second valve may be configured as a constant flow on/off valve for controlling the flow path of the heating water supply pipe for hot water supply so that the heating water with the flow rate corresponding to the set value flows through the heating water supply pipe for hot water supply and for opening/closing the flow path of the heating water supply pipe for hot water supply.

The system may further include a flow switch installed in a water supply pipe for hot water supply, branched from a water supply pipe extended from a water supply pump and connected to the hot water supply heat exchanger so as to generate a signal for controlling the first and second valves so that hot water is supplied to the hot water supply heat exchanger by sensing a flow of fluid upon the opening of a water faucet.

The system may further include a water circulation pipe configured to connect an end of a hot water supply pipe connected to the water faucet from the hot water supply heat exchanger to the water supply pipe for hot water supply so as to circulate the hot water; a hot water circulation pump installed at an end of the water circulation pipe or the water supply pipe for hot water supply so as to circulate the hot water in the pipe; a temperature sensor installed in the water supply pipe for hot water supply or the water circulation pipe so as to detect a temperature of the hot water; and a temperature control circuit unit performing reheating of the hot water by receiving a temperature value of the hot water, inputted by a user, comparing the temperature value inputted by the user with the temperature value detected by the temperature sensor, and, when the detected temperature value is smaller than the inputted temperature value, driving the hot water circulation pump and controlling the first and second valves so that the heating water is supplied to the hot water supply heat exchanger.

The circulation pump may be configured with a plurality of pumps, and the controller may have an operation control function of variably controlling the flow rate of the heating water circulated by the circulation pumps depending on the change of calorie, required in each household or floor.

The circulation pump may be configured with one pump, and the controller may have an inverter control function of variably controlling the flow rate of the heating water circulated by the circulation pump depending on the change of calorie, required in each household or floor.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

Figure 1:
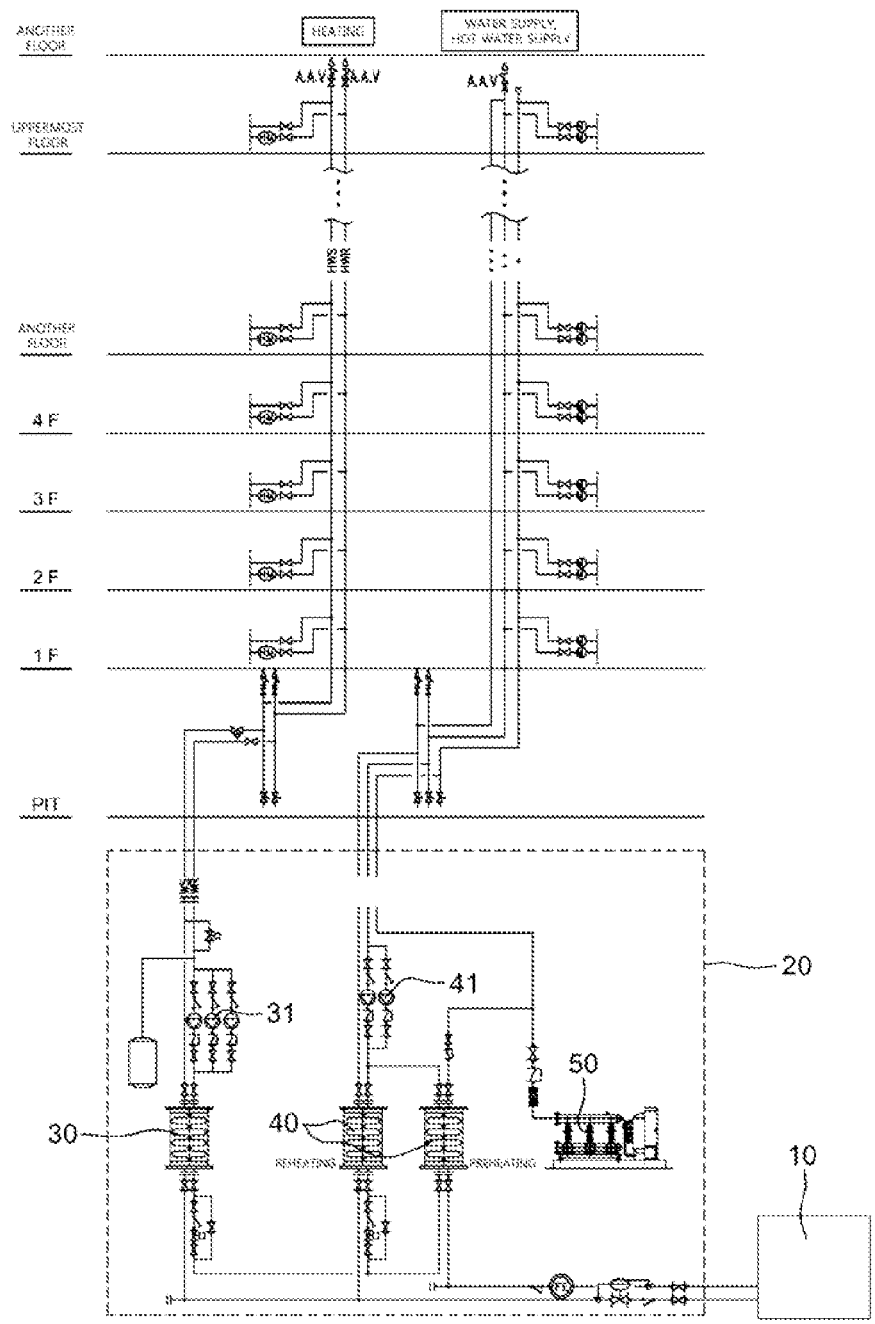
FIG. 1 is a structural view of a conventional central heating and hot water supply system.
Figure 2:
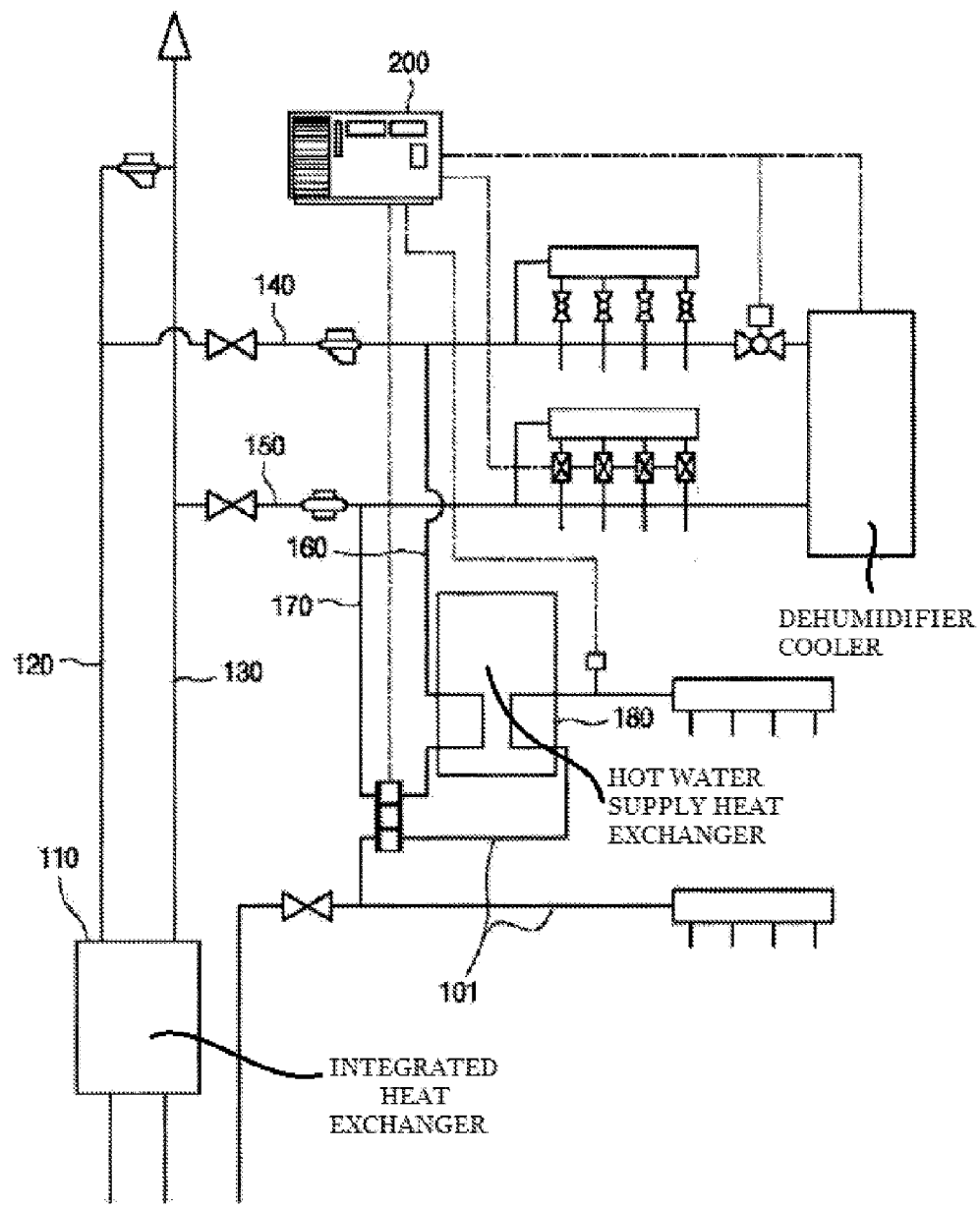
FIG. 2 is a structural view of a conventional integrated piping system.
Figure 3:
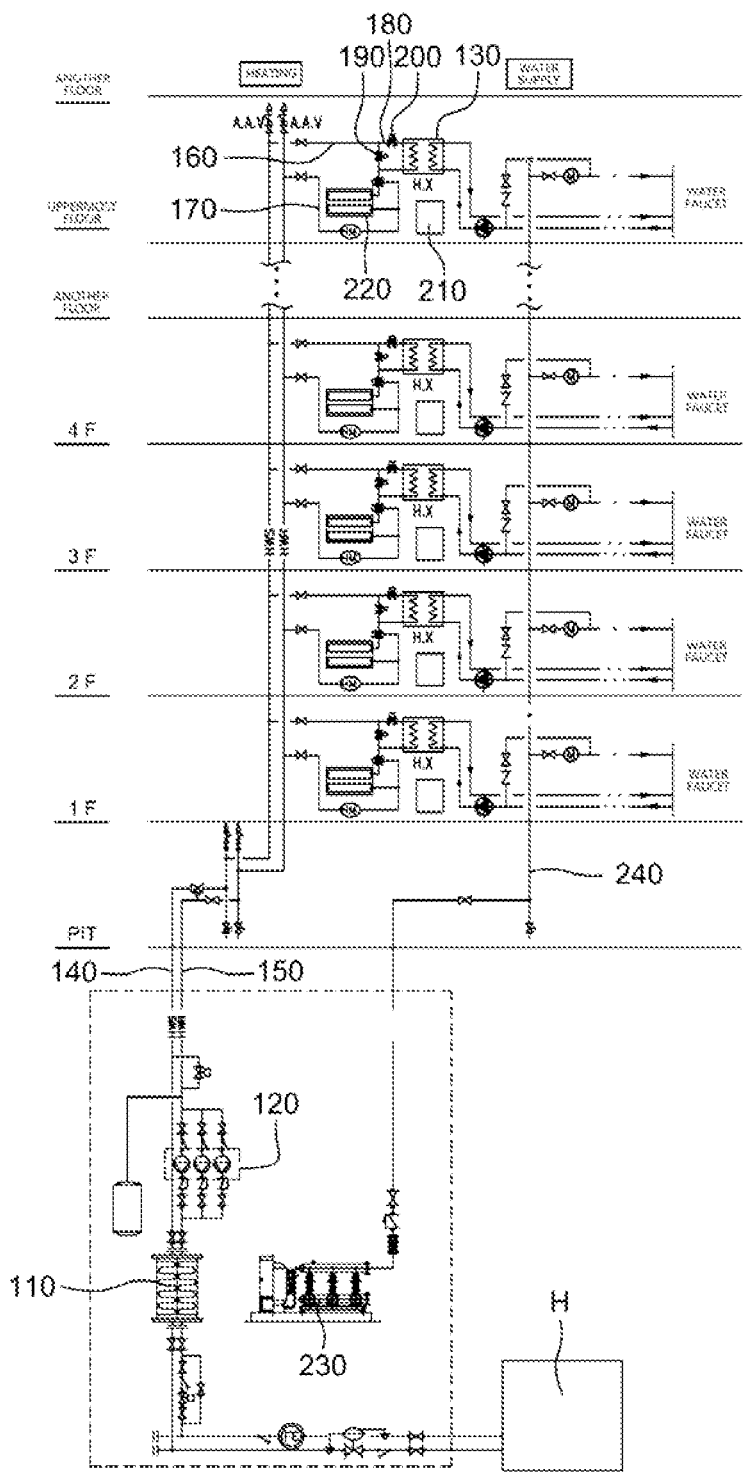
FIG. 3 is a structural view of a central heating and hot water supply system according to an embodiment of the present invention.
Figure 4:
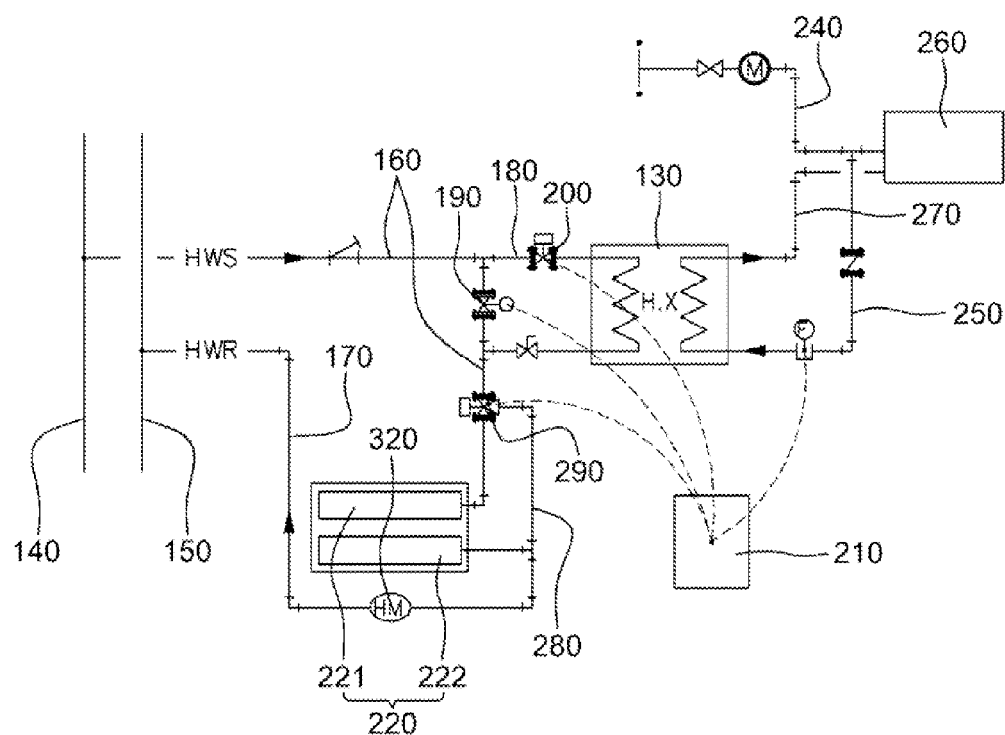
FIG. 4 is a structural view specifically showing a main part of the central heating and hot water supply system according to the embodiment of the present invention.

FIG. 3 is a structural view of a central heating and hot water supply system according to an embodiment of the present invention. FIG. 4 is a structural view specifically showing a main part of the central heating and hot water supply system according to the embodiment of the present invention.

In the central heating and hot water supply system according to this embodiment, when hot water is produced for each household or floor using heating water supplied for the purposed of heating of each household or floor, heating water primarily radiated in a hot water supply heat exchanger is directly circulated through a hot water distributor for each household or floor, or through a floor coil provided in the floor, so that it is possible to minimize the amount of heat lost in the process of returning the heating water used for the production of the hot water to a main heat exchanger, and to effectively reuse surplus heat in heating.

To this end, the central heating and hot water supply system according to this embodiment includes a main heat exchanger 110, a circulation pump 120 and a hot water supply heat exchanger 130.

The main heat exchanger 110 produces heating water by receiving any one of heat sources such as hot water, medium temperature water, and steam, produced in a heat production facility H such as a medium- or large-sized central boiler for public use, waste heat of a power plant, or the like, and performing a heat exchange.

The circulation pump 120 circulates heating water so that the heating water produced in the main heat exchanger 110 can be supplied and collected to/from each household or floor. The circulation pump 120 may be configured with one or a plurality of circulation pumps.

The hot water supply heat exchanger 130 is installed for each household when a hot water supply structure is provided for each household, and is installed for each floor when the hot water supply structure is provided for each floor. The hot water heat exchanger 130 produces hot water through a heat exchange between water and heating water supplied to the main heat exchanger 110, and supplies the heating water used in heating of the hot water and then primarily radiated to a hot water distributor 220 installed for each household or floor so as to be circulated through a floor coil provided for each household or floor or supplies the heating water directly to the floor coil provided for each household or floor so as to be circulated through the floor coil. Accordingly, the primarily radiated heating water can be reused as water for heating. As such, surplus heat of the heating water is used for heating by circulating the primarily radiated heating water for producing the hot water through the floor coil, so that it is possible to improve the use efficiency of the heating water and to minimize the amount of heat lost in the process of returning the primarily radiated heating water to the main heat exchanger 110, thereby saving energy.

The hot water produced in the hot water supply heat exchanger 130 is supplied to a water faucet 260 through a hot water supply pipe 270, and the hot water supply heat exchange 130 is connected to a water supply pipe 250 for hot water supply, branched from a water supply pipe 240 extended from the a water supply pump 230 and connected to the water faucet 260 so as to receive water for hot water supply. The hot water supply heat exchanger 130 may be at least one of a planar heat exchanger, a spiral heat exchanger and a shell & tube heat exchanger, and is preferably configured using the planar heat exchanger having small volume and excellent heat efficiency. Here, the heat exchangers described above are techniques well known in the art, and therefore, their detailed descriptions will be omitted.

The central heating and hot water supply system also includes an integrated hot water supply main pipe 140 for properly circulating and controlling heating water by connecting the main heat exchanger 110 to the hot water supply exchanger 130 and the hot water distributor 220, an integrated hot water return main pipe 150, a heating water supply pipe 160, a heating water return pipe 170, a heating water supply pipe 180 for hot water supply, a first valve 190, a second valve 200 and a controller 210.

The integrated hot water supply main pipe 140 is extended from the main heat exchanger 110 so as to provide a flow path along which the heating water produced in the main heat exchanger 110 is supplied.

The integrated hot water return main pipe 150 is connected to the main heat exchanger 110 so as to provide a flow path along which the heating water used for heating or hot water supply is returned to the main heat exchanger 110. One or more circulation pumps 120 are installed in the integrated hot water return main pipe 150.

The heating water supply pipe 160 is installed for each household or floor. The heating water supply pipe 160 is configured to connect the integrated hot water supply main pipe 140 to a supply side 221 of the hot water distributor 220.

The heating water return pipe 170 is installed for each household or floor. The heating water return pipe 170 is configured to connect the integrated hot water return main pipe 150 to a collection side 222 of the hot water distributor 220.

The heating water supply pipe 180 for hot water supply is branched from the heating water supply pipe 160 and connected to the hot water supply heat exchanger 130 so as to provide a flow path along which the heating water supplied through the heating water supply pipe 160 is supplied.

The first valve 190 is installed in the heating water supply pipe 160 so as to control the flow path of the heating water supply pipe 160, and the second valve 200 is installed in the heating water supply pipe 180 for hot water supply so as to control the flow path of the heating water supply pipe 180 for hot water supply.

The controller 210 is used to control the central heating and hot water supply system. The controller 210 controls the supply direction of heating water so that the heating water supplied through the heating water supply pipe 160 is supplied to any one of the hot water distributor 220 and the hot water supply heat exchanger 130.

Meanwhile, the hot water supply requires a large amount of hot water as compared with the heating. Therefore, if the heating water used for the production of hot water is supplied to the hot water distributor 220 or the floor coil for the purpose of the heating, an excessive load may be provided to pipes for heating due to the supply of an excessive amount of heating water. Thus, if is preferable that the central heating and hot water supply system may further include a bypass pipe 280 for connecting the heating water supply pipe 160 to the heating water return pipe 170, and a pipeline control unit 290 for distributing the heating water supplied to the hot water distributor 220 and the bypass pipe 280 at a predetermined rate so that the surplus amount of the heating water used for the production of hot water is returned to the heating water return pipe 170.

In this case, the pipeline control unit 290 may be configured as a proportional control 3-way valve known in the art.

As known in the art, the proportional control 3-way valve distributes and discharges fluid that flows through any one port at a predetermined ratio through the other two ports depending on a setup value. The proportional control 3-way valve distributes and discharges the heating water at the predetermined ratio to the hot water distributor (or floor coil) and the bypass pipe 280 depending on a value set by the controller 210.

In a case where the primarily radiated heating water is supplied for the purpose of the production of hot water, a constant amount of heating water is always supplied to the hot water distributor 220 or the floor coil. In this case, a surplus amount of the heating water is returned to the heating water return pipe 170 through the bypass pipe 280.

In a case where the pipeline control unit 290 is configured as the proportional control 3-way valve, the first valve 190 is configured as a constant flow on/off valve for controlling a flow path so that heating water with a flow rate corresponding to a setup value flows through the heating water supply pipe 160 and for opening/closing the flow path of the heating water supply pipe 160. The second valve 200 is also configured as a constant flow on/off valve for controlling a flow path so that heating water with a flow rate corresponding to a setup value flows through the heating water supply pipe 180 for hot water supply and for opening/closing the flow path of the heating water supply pipe 180 for hot water supply.

Figure 5:
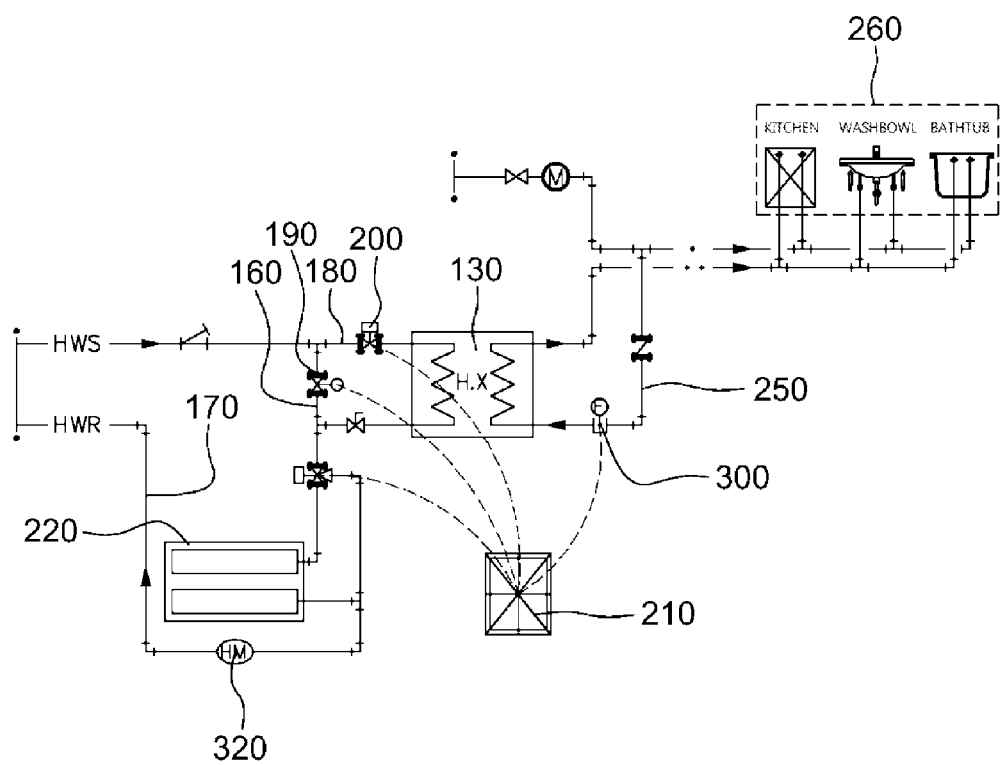
FIG. 5 is a structural view of a heating and hot water supply system in which hot water is produced by an instant heating method using a proportional control 3-way valve.

FIG. 5 is a structural view of a heating and hot water supply system in which hot water is produced by an instant heating method using a proportional control 3-way valve.

A flow switch 300 is installed in the water supply pipe 250 for hot water supply connected to the hot water supply heat exchanger 130, and the controller 210 controls the first and second valves 190 and 200 based on a signal generated from the flow switch 300, thereby implementing a hot water supply system using an instant heating method.

More specifically, the flow switch 300 installed in the water supply pipe 250 for hot water supply generates a signal by sensing the flow of hot water, induced by an operation of the water faucet 260. The signal generated from the flow switch 300 is transferred to the controller 210. The controller 210 controls the first valve 190 to close the flow path of the heating water supply pipe 160 and the second valve 200 to open the flow path of the heating water supply pipe 180 for hot water supply so that the heating water for producing hot water is supplied to the hot water supply heat exchanger 130.

In a case where the flow of the water for hot water supply is stopped by closing the water faucet 260, the controller 210 controls the first valve 190 to open the flow path of the heating water supply pipe 160, and controls the second valve 200 to close the flow path of the heating water supply pipe 180 for hot water supply.

The hot water supply system using the instant heating method allows heating water not to be circulated in the hot water supply heat exchanger 130 when the water faucet 260 is not used, so that it is possible to reduce unnecessary energy loss.

Figure 6:
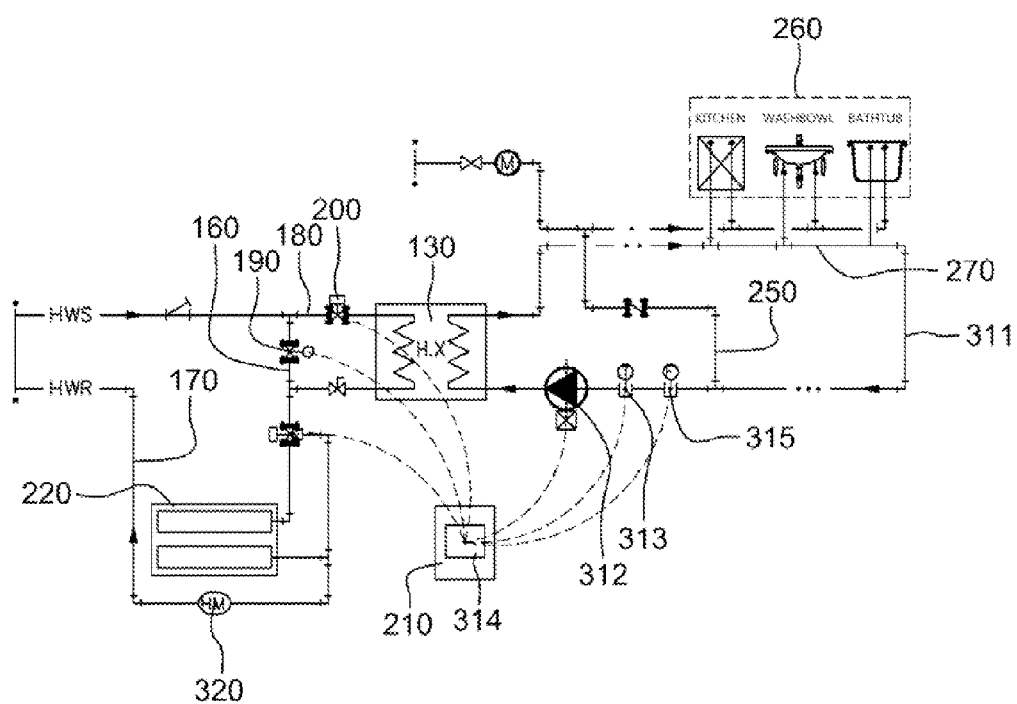
FIG. 6 is a structural view of a heating and hot water supply system in which hot water is produced by a reheating method using a proportional control 3-way valve.

FIG. 6 is a structural view of a heating and hot water supply system in which hot water is produced by a reheating method using a proportional control 3-way valve.

Hot water in the hot water supply pipe 270 is reheated by being circulated in the hot water supply heat exchanger 130, so that the temperature of the hot water can be maintained at a constant temperature. In a case where tepid water or cool water is discharged in an initial stage upon the opening of the water faucet 260, the tepid water or cool water is not used and is wasted, causing the waste of a water resource. Accordingly, if the temperature of the hot water in the hot water supply pipe 270 is always maintained constant regardless of the presence of use of the hot water, the hot water can be provided from the initial stage upon the opening of the water faucet 260, thereby preventing the waste of the water resource.

To this end, the central heating and hot-water supply system further includes a water circulation pipe 311, a hot water circulation pump 312, a temperature sensor 313 and a temperature control circuit unit 314.

The water circulation pipe 311 connects an end of the hot water supply pipe 270 to the water supply pipe 250 for hot water supply so as to form a flow path along which the hot water is circulated.

The hot water circulation pump 312 is installed at an end of the water circulation pipe 311 or the water supply pipe 250 for hot water supply so as to circulate the hot water. The structure in which the hot water circulation pump 312 is installed at the end of the water supply pipe 250 for hot water supply is shown in FIG. 6.

The temperature sensor 313 is installed at an end of the water circulation pipe 311 or the water supply pipe 250 for hot water supply so as to detect the temperature of the hot water. The structure in which the temperature sensor 313 is installed at the end of the water supply pipe 250 for hot water supply is shown in FIG. 6.

The temperature control circuit unit 314 receives a temperature value of hot water, inputted from a user, and controls the hot water circulation pump 312 and the first and second valves 190 and 200 based on the temperature value set by the user and the temperature value detected by the temperature sensor 313, thereby reheating the hot water.

More specifically, in a case where the detected temperature value is smaller than the set temperature value, the temperature control circuit unit 314 drives the hot water circulation pump 312 for the purpose of reheating of the hot water, and allows the hot water to be supplied to the hot water supply exchanger 130 by controlling the first valve 190 to close the flow path of the heating water supply pipe 160 and controlling the second valve 200 to open the flow path of the heating water supply pipe 180 for hot water supply. In a case where the set temperature value is identical to or greater than the detected temperature value, the temperature control circuit unit 314 stops the driving of the hot water circulation pump 312 and closes the flow of the hot water in the hot water supply heat exchanger 130 so as to prevent unnecessary energy consumption.

The temperature control circuit unit 314 is included in the controller 210.

Through the structure of receiving a temperature of hot water, inputted from a user, and reheating the hot water so that the hot water in the pipes (the hot water supply pipe and the water circulation pipe) maintains the inputted temperature, it is possible to prevent waste of the water resource and to individually control the temperature of hot water for each household or floor. Accordingly, it is possible to provide a more pleasant environment for hot water use.

Meanwhile, reference numeral 315 denotes a flow switch. In a case where the hot water is discharged and water for the hot water supply is supplied by the opening of the water faucet 260, the flow switch 315 senses the flow of the water for the hot water supply and generates a signal. The controller 210 controls the first and second valves 190 and 200 based on the generated signal so that the hot water is supplied to the hot water supply heat exchanger 130.

A calorimeter 320 for detecting a calorie of hot water used for heating and hot water supply is installed in the heating water return pipe 170 extended from the hot water distributor 220 to the main heat exchanger 110. The calorimeter 320 installed as described above calculates a calorie used for heating supply and a calorie used for hot water supply, and the fee for the use amount of hot water is charged based on the calculated calorie, so that it is possible to eliminate a civil complaint caused by measuring the use amount of hot water in the conventional central heating and hot water supply system.

That is, in the conventional heating and hot water supply system, the calorie fee used for the heating supply is charged using a calorimeter or flowmeter, but the calorie fee used for the hot water supply is charged using a hot water meter. Therefore, if a user does not recognize a case where the hot water is not supplied or where hot water is cooled down and radiated due to congestion in the hot water flow of the pipe and opens the water faucet, tepid water is added as a use amount in the meter, and hence a public complaint may be proposed. However, in the present invention, the use amount of hot water is also detected using the calorimeter 320 for the heating supply, so that it is possible to prevent the occurrence of a civil complaint in advance and to induce energy saving and reduction of water consumption.

Figure 7:
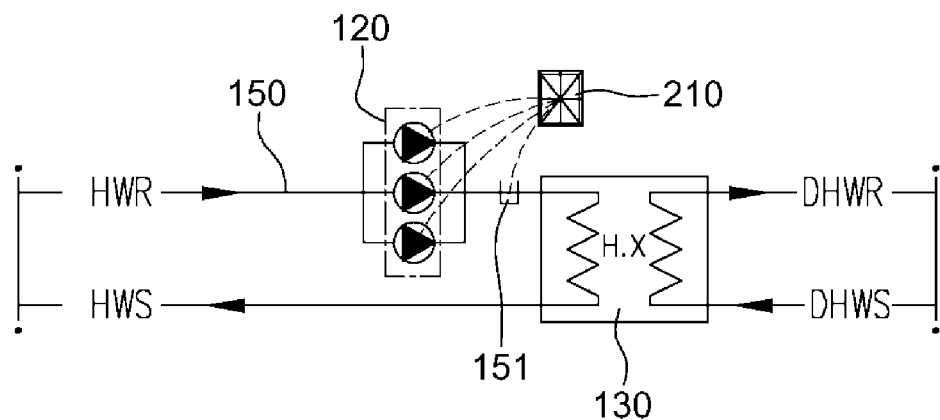
FIG. 7 is a conceptual view showing an operation number control of a circulation pump.
Figure 8:
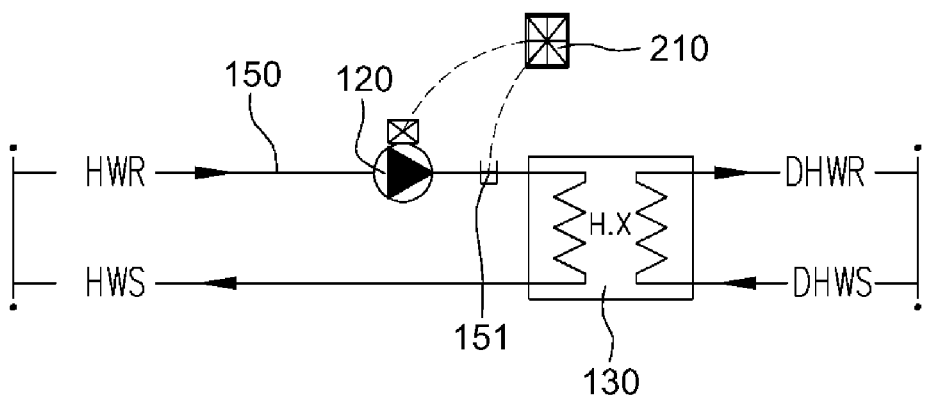
FIG. 8 is a conceptual view showing a rotation number control of the circulation pump.

FIG. 7 is a conceptual view showing an operation number control of a circulation pump. FIG. 8 is a conceptual view showing a rotation number control of the circulation pump.

The amounts of water necessary for heating and hot water supply are different from each other. If the supply amount of heating water is set suitable only for hot water supply, the load on the pipes constituting a heating system increases. Therefore, damage to the pipes is accelerated, and unnecessary energy consumption occurs. On the contrary, if the supply amount of heating water is set suitable only for heating supply, the hot water is not sufficiently heated.

An operation number control or inverter control of the circulation pump 120 may be introduced to solve such a problem.

In the operation number control, the circulation pump 120 is configured with a plurality of pumps so that the supply amount of heating water can be controlled by subdividing the flow rate of the pump. The operation number control has an operation control function for controlling the operation number of the circulation pump 120 so that the flow rate of heating water circulated by the circulation pump 120 is variably controlled depending on the change of calorie required for each household or floor.

In order to perform the operation number control described above, a pressure sensor 151 for detecting a pressure in the pipe is installed in the integrated hot water return main pipe 150, and the controller 210 receives a pressure value detected by the pressure sensor 151 so as to perform the operation number control.

The inverter control is implemented by one circulation pump 120 and an inverter controller for the circulation pump 120, provided in the controller 210. The controller 210 is performed by an inverter method of controlling the rotation number of the circulation pump 120 through frequency modulation of a motor of the circulation pump, based on the pressure value detected by the pressure sensor 151 installed in the integrated hot water return main pipe 150.

A heating and hot water supply process in the energy-saving central heating and hot water supply system will be described.

First, any one of heat sources such as hot water, medium temperature water, and steam, produced in the heat production facility H, is supplied to the main heat exchanger 110 provided in a machine room, and heating water is produced by the heat source supplied to the main heat exchanger 110. The produced heating water is supplied to the hot water distributor 220 provided for each household or floor through the integrated hot water supply main pipe 140 and the heating water supply pipe 160.

In order to supply the heating water to the hot water distributor 220, the first valve 190 opens the flow path of the heating water supply pipe 160, and the second valve 200 closes the flow path of the heating water supply pipe 180 for hot water supply. The proportional control 3-way valve closes the flow path connected to the bypass pipe 280. Thus, the heating water supplied through the heating water supply pipe 160 flows in the hot water distributor 220 and then supplied to the floor coil depending on a setup state of the hot water distributor 220, thereby performing heating supply.

Meanwhile, when the proportional control 3-way valve is used, the first and second valves 190 and 200 are configured as constant flow on/off valves. Therefore, the heating water with a flow rate corresponding to a value set to the first valve 190 is supplied. In the hot water supply heat exchanger 130, only the flow rate corresponding to a value set to the second valve 200 is supplied. As such, each of the first and second valves 190 and 200 flows heating water with only the flow rate corresponding to the value set thereto. Thus, if the heating water with a flow rate greater than that corresponding to the set value is discharged from the circulation pump, the pressure of the fluid in the integrated hot water supply main pipe 140 or the integrated hot water return main pipe 150 increases, and the increase of pressure is detected by the pressure sensor 151 installed in the integrated hot water return main pipe 150. The pressure value detected by the pressure sensor 151 is transferred to the controller 210, and the controller 210 properly controls the load of heating water discharged from the circulation pump 120 through the operation number control or the inverter control of the circulation pump 120, based on the pressure detected from the pressure sensor.

In the heating and hot water supply system (See FIG. 5) for producing hot water using the instant heating method, if a user opens the water faucet 260 for the purpose of using of hot water, the flow switch 300 generates a signal by sensing a flow of water for hot water supply, and the controller 210 controls the first and second valves 190 and 200 to close the flow path of the heating water supply pipe 160 and to open the flow path of the heating water supply pipe 180 for hot water supply, respectively, based on the signal generated from the flow switch 300.

In the heating and hot water supply system (See FIG. 6) for producing hot water using the reheating method, in a case where the user opens the water faucet 260 for the purpose of the use of hot water or where the temperature of the hot water is lower than the set temperature value, the controller 210 controls the first and second valves 190 and 200 to close the flow path of the heating water supply pipe 160 and to open the flow path of the heating water supply pipe 180 for hot water supply, respectively.

If the flow path of the heating water supply pipe 160 is closed and the flow path of the heating water supply pipe 180 for hot water supply is opened, the heating water is supplied to the hot water supply heat exchanger 130, and water for hot water supply is heated through a heat exchange between the heating water and the water for hot water supply, to produce hot water. The produced hot water is supplied to the water faucet 260 through the hot water supply pipe 270.

In the system for circulating hot water as shown in FIG. 6, the heated hot water is discharged through the water faucet 260 or is continuously circulated. If the temperature of the heating water approaches the set temperature value though the circulation and reheating of the heating water, the temperature control circuit unit 314 stops the hot water circulation pump 312. Then, the temperature control circuit unit 314 opens the flow path of the heating water supply pipe 160 using the first valve 190, and closes the flow path of the heating water supply pipe 180 for hot water supply using the second valve 200 so that the heating water is again supplied to the hot water distributor 220.

The heating water subjected to the heat exchange with the water for hot water supply by being supplied to the hot water supply heat exchanger 130 flows in the hot water distributor 220 or directly flows in the floor coil without passing through the hot water distributor 220. The surplus heating water in the flow of the primarily radiated heating water flows in the bypass pipe 280 by the proportion control 3-way valve.

In the central heating and hot water supply system configured as described above, heating water with a temperature of about 40 to 45° C., primarily radiated by passing through the hot water supply heat exchanger 130, is circulated through the floor coil provided for each household or floor and then circulated in the main heat exchanger 110. Thus, it is possible to minimize heat loss caused by a difference in temperature between the inside and outside of the pipe in the process of returning the heating water to the main heat exchanger 110. Further, the radiation calorie caused by a difference in temperature between the inside and outside of the conventional pipe is used in heating, so that it is possible to save energy.

Figure 9:
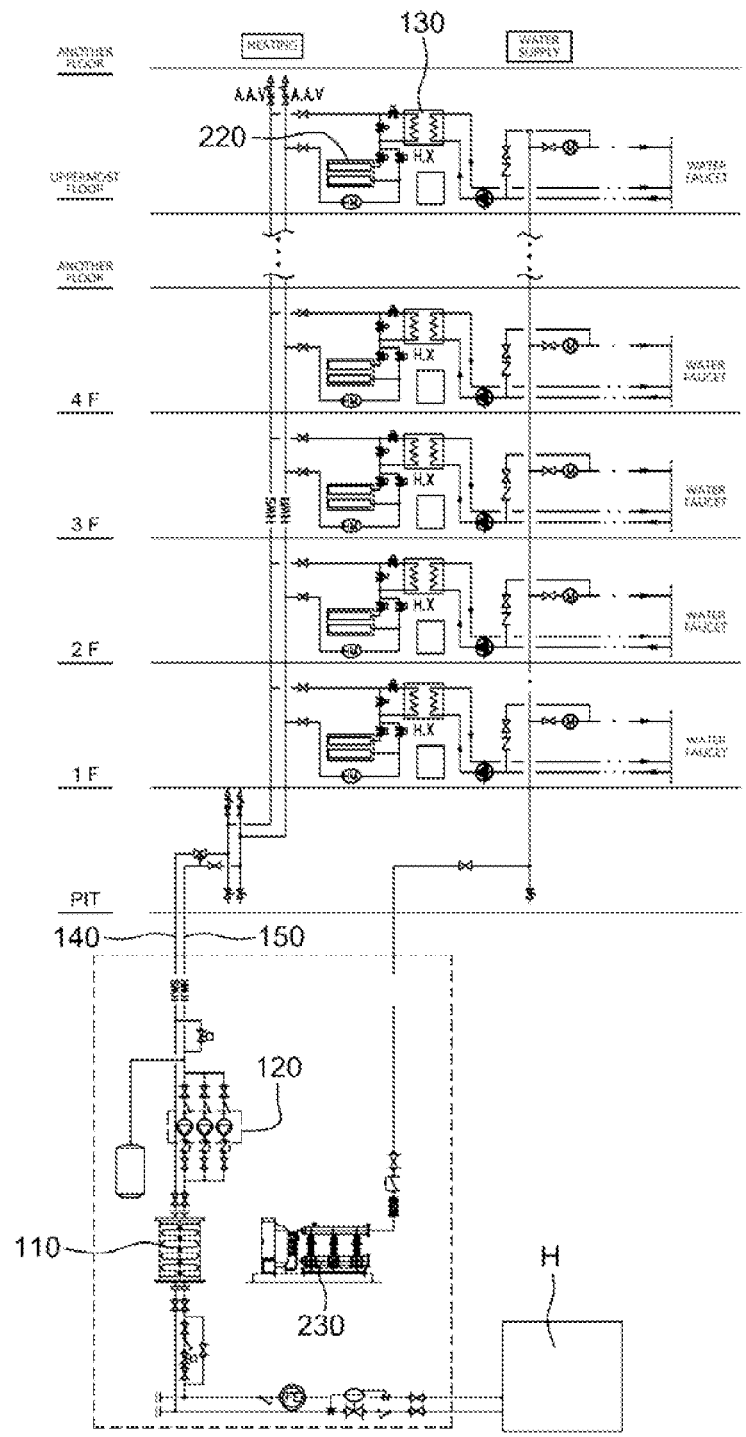
FIG. 9 is a structural view of a central heating and hot water supply system according to another embodiment of the present invention.
Figure 10:
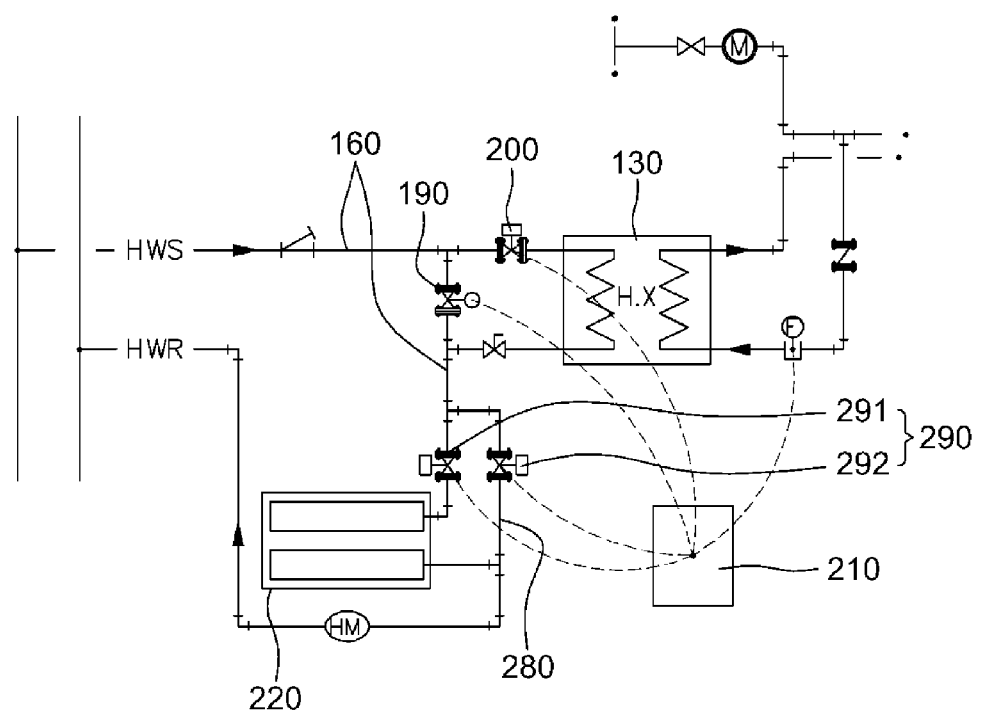
FIG. 10 is a structural view specifically showing a main part of the central heating and hot water supply system of FIG. 9.

FIG. 9 is a structural view of a central heating and hot water supply system according to another embodiment of the present invention. FIG. 10 is a structural view specifically showing a main part of the central heating and hot water supply system of FIG. 9.

The central heating and hot water supply system according to this embodiment includes a main heat exchanger 110, a circulation pump 120 and a hot water heat exchanger 130, like in the central heating and hot water supply system described with reference to FIGS. 3 to 8. The other components are identical to those in the central heating and hot water supply system described with reference to FIGS. 3 to 8, except that the pipeline control unit 290 is composed of a constant flow valve 291 and a third constant flow on/off valve 292, and the first and second valves 190 and 200 are configured as an on/off valve and a constant flow on/off valve, respectively.

Therefore, the pipeline control unit 290 and the first and second valves 190 and 200 will be mainly described below, and descriptions of the other components will be omitted.

As described above, the pipeline control unit 290 according to this embodiment is composed of a constant flow valve 291 and a third constant flow on/off valve 292.

The constant flow valve 291 is installed at an end of the heating water supply pipe 160 and controls the flow path of the heating water supply pipe 160 so that heating water with a flow rate corresponding to a setup value is supplied to the hot water distributor 220.

The third constant on/off valve 292 is installed in the bypass pipe 280 so as to discharge the heating water with a flow rate corresponding to the setup value through the bypass pipe 280 and to open/close the flow path of the bypass pipe 280.

According to the constant flow valve 291 and the third constant flow on/off valve 292, the constant flow valve 291 controls the flow path of the heating water supply pipe 160 so that the heating water with a constant flow rate is always supplied to the hot water distributor 220 regardless of the amount of the heating water supplied directly from the main heat exchanger 110 or supplied at a primarily radiated state by passing through the hot water supply heat exchanger 130, and the third constant flow on/off valve 292 discharges surplus heating water through the bypass pipe 280.

In a case where the pipeline control unit 290 is composed of the constant flow valve 291 and the third constant flow on/off valve 292, the first valve 190 is configured as an on/off valve for simply opening/closing the flow path of the heating water supply pipe 160 because the first valve 190 does not require the control of flow rate, and the second valve 200 is configured as a constant flow on/off valve.

In this embodiment, the pipeline control unit 290 is configured using the constant flow valve 291 and the third constant flow on/off valve 292, so that the control of the system can be simplified.

That is, in the central heating and hot water supply system shown in FIGS. 3 to 6, the proportional control 3-way valve used as the pipeline control unit 290 must perform a complicated control so that heating water with a constant flow rate is supplied to the hot water distributor 220 regardless of the amount of heating water changed depending on the presence of use of hot water. However, in this embodiment, the pipeline control unit 290 is configured using the constant flow valve 291 and the third constant flow on/off valve 292, so that heating water with a constant flow rate is supplied to the hot water distributor 220 without a separated control, thereby simplifying a control algorithm.

Figure 11:
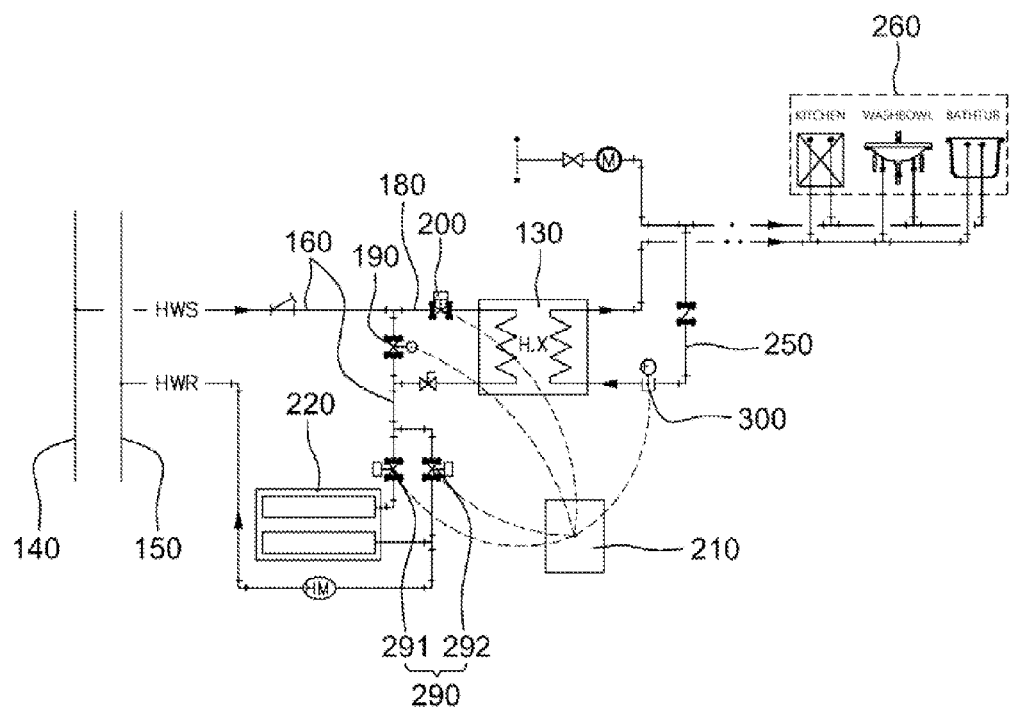
FIG. 11 is a structural view of a central heating and hot water supply system using the instant heating method, in which a constant flow valve and a constant flow on/off valve are used for a pipeline control unit.
Figure 12:
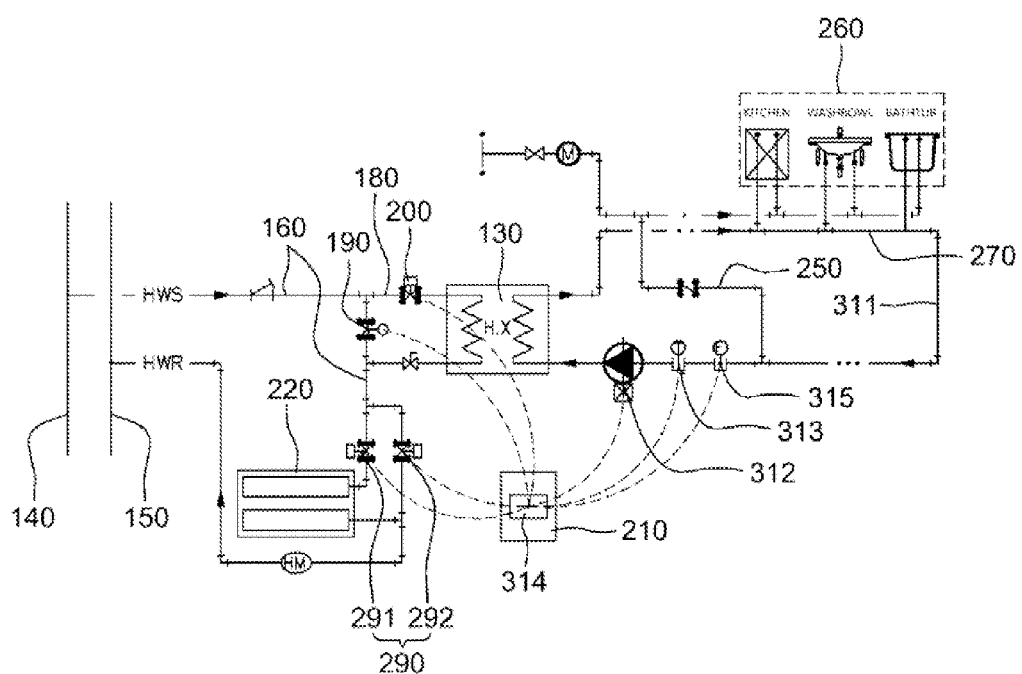
FIG. 12 is a structural view of a central heating and hot water supply system using the reheating method, in which the constant flow valve and the constant flow on/off valve are used for the pipeline control unit.

FIG. 11 is a structural view of a central heating and hot water supply system using the instant heating method, in which a constant flow valve and a constant flow on/off valve are used for a pipeline control unit. FIG. 12 is a structural view of a central heating and hot water supply system using the reheating method, in which the constant flow valve and the constant flow on/off valve are used for the pipeline control unit.

The principle of supplying heating or hot water in the central heating and hot water supply system using the instant heating method shown in FIG. 11 is identical to that in the central heating and hot water supply system described with reference to FIG. 5, and the principle of supplying heating or hot water in the central heating and hot water supply system using the reheating method shown in FIG. 12 is identical to that in the central heating and hot water supply system described with reference to FIG. 6. Therefore, their detailed descriptions will be omitted.

As described above, according to the present invention, heating water used to heat hot water primarily radiated by passing through a hot water supply heat exchanger is not returned to the main heat exchanger by a circulation pump but circulated through the hot water distributor or secondarily circulated directly in the floor coil, so that it is possible to improve the use efficiency of the supplied hot water, to minimize heat loss caused in the process of circulating the heating water in a main heat exchanger and to save energy.

Also, it is possible to improve the environment in which hot water is used by enabling hot water to be supplied suitable for a temperature required for each household, and it is possible to prevent excessive energy consumption as in the conventional method of supplying hot water with a temperature even when the required temperatures of hot water are different from each other.

Also, when a user uses hot water, the hot water with a temperature set by the user is immediately supplied, so that it is possible to reduce or remove the amount of tepid or cool water discharged without being used initially, thereby preventing waste of water resources.

Also, since the supply of hot water is intermittent, heating is controlled to stop heating the hot water temporarily or hot water discharged after the heating of the hot water is reused, so that only the heat capacity corresponding to the maximum load in the heating and hot water supply is supplied, thereby remarkably reducing the supply amount of hot water supplied to an integrated hot water supply main pipe, that the size of installation pipes is reduced, thereby saving construction costs, that the total heat area is decreased, thereby reducing heat loss, and that the flow rate of transferred hot water is decreased, thereby reducing operating costs.

Also, the flow rate of heating water is variably controlled depending on the loads of heating and hot water required through an operation control of a heating water circulation pump for circulating the heating water, so that it is possible to reduce energy cost.

Although a few embodiments of the present invention have been shown and described, it would be appreciated by those skilled in the art that changes may be made in this embodiment without departing from the principles and spirit of the invention, the scope of which is defined in the claims, and their equivalents.

What is claimed is:

1. An energy-saving central heating and hot water supply system, the system comprising:
   a main heat exchanger configured to receive one of heat sources among hot water, medium temperature water, and steam from a heat production facility and produce heating water through a main heat exchange;

a circulation pump configured to circulate the heating water produced in the main heat exchanger so that the heating water is supplied to and collected from each household or floor;

a hot water supply heat exchanger located at each household or floor so as to produce hot water through a hot water supply heat exchange by utilizing the heating water supplied from the main heat exchanger, wherein the produced hot water is circulated in a floor coil through a hot water distributor located at the same household or floor or is directly circulated in the floor coil;

an integrated hot water supply main pipe extended from the main heat exchanger so as to supply the produced hot water;

an integrated hot water return main pipe extended from the main heat exchanger so as to return the used heating water to the main heat exchanger;

a heating water supply pipe configured to connect the integrated hot water supply main pipe to a supply side of the hot water distributor;

a heating water return pipe configured to connect the integrated hot water return main pipe to a collection side of the hot water distributor;

a heating water supply pipe for hot water supply branched from the heating water supply pipe and connected to the hot water supply heat exchanger;

a first valve installed in the heating water supply pipe so as to control a flow path of the heating water supply pipe;

a second valve installed in the heating water supply pipe for hot water supply so as to control a flow path of the heating water supply pipe for hot water supply;

a controller configured to control the first and second valves to supply the heating water supplied through the heating water supply pipe to the hot water distributor or the hot water supply heat exchanger depending on the present use of the hot water;

a bypass pipe configured to return a portion of the heating water supplied from the hot water supply heat exchanger to the hot water distributor to the heating water return pipe by connecting the heating water supply pipe to the heating water return pipe; and a pipeline control unit configured to distribute the heating water discharged from the hot water supply heat exchanger to the hot water distributor and the bypass pipe at a predetermined ratio.

2. The system of claim 1, wherein the pipeline control unit is configured as a proportional control 3-way valve located at a connection portion between the heating water supply pipe and the bypass pipe so as to distribute the heating water to the heating water supply pipe and the bypass pipe based on a value set by the controller.

3. The system of claim 2, wherein the first valve is configured as a constant flow on/off valve for controlling the flow path of the heating water supply pipe so that heating water with a flow rate corresponding to the set value flows through the heating water supply pipe and for opening/closing the flow path of the heating water supply pipe, and the second valve is configured as a constant flow on/off valve for controlling the flow path of the heating water supply pipe for hot water supply so that the heating water with the flow rate corresponding to the set value flows through the heating water supply pipe for hot water supply and for opening/closing the flow path of the heating water supply pipe for hot water supply.

4. The system of claim 1, wherein the pipeline control unit comprises:
a constant flow valve installed at an end of the heating water supply pipe so as to control the flow path of the heating water supply pipe so that the heating water with the flow rate corresponding to the set value is supplied to the hot water distributor; and
a third constant flow on/off valve installed in the bypass pipe so as to control a flow path of the bypass pipe so that the heating water with the flow rate corresponding to the set value is discharged through the bypass pipe and to open/close the flow path of the bypass pipe.

5. The system of claim 4, wherein the first valve is configured as an on/off valve for opening/closing the heating water supply pipe, and the second valve is configured as a constant flow on/off valve for controlling the flow path of the heating water supply pipe for hot water supply so that the heating water with the flow rate corresponding to the set value flows through the heating water supply pipe for hot water supply and for opening/closing the flow path of the heating water supply pipe for hot water supply.

6. The system of claim 1, further comprising a flow switch installed in a water supply pipe for hot water supply, branched from a water supply pipe extended from a water supply pump and connected to the hot water supply heat exchanger so as to generate a signal for controlling the first and second valves so that the hot water is supplied to the hot water supply heat exchanger by sensing a flow of fluid upon the opening of a water faucet.

7. The system of claim 1, further comprising:
a water circulation pipe configured to connect an end of a hot water supply pipe connected to a water faucet from the hot water supply heat exchanger to the water supply pipe for hot water supply so as to circulate the hot water;
a hot water circulation pump installed at an end of the water circulation pipe or the water supply pipe for hot water supply so as to circulate the hot water in the pipe;
a temperature sensor installed in the water supply pipe for hot water supply or the water circulation pipe so as to detect a temperature of the hot water; and
a temperature control circuit unit performing reheating of the hot water by receiving a temperature value of the hot water, inputted by a user, comparing the temperature value inputted by the user with the temperature value detected by the temperature sensor, and, when the detected temperature value is smaller than the inputted temperature value, driving the hot water circulation pump and controlling the first and second valves so that the heating water is supplied to the hot water supply heat exchanger.

8. The system of claim 1, wherein the circulation pump is configured with a plurality of pumps, and the controller has an operation control function of variably controlling the flow rate of the heating water circulated by the circulation pumps depending on the change of calorie, required in each household or floor.

9. The system of claim 1, wherein the circulation pump is configured with one pump, and the controller has an inverter control function of variably controlling the flow rate of the heating water circulated by the circulation pump depending on the change of calorie, required in each household or floor.

* * * * *